(12) United States Patent
Toishi et al.

(10) Patent No.: US 8,072,660 B2
(45) Date of Patent: Dec. 6, 2011

(54) HOLOGRAM RECORDING APPARATUS AND HOLOGRAM RECONSTRUCTION APPARATUS

(75) Inventors: Mitsuru Toishi, Kanagawa (JP); Masaaki Hara, Tokyo (JP)

(73) Assignee: Sony Corporation, Tokyo (JP)

( * ) Notice: Subject to any disclaimer, the term of this patent is extended or adjusted under 35 U.S.C. 154(b) by 612 days.

(21) Appl. No.: 11/684,441

(22) Filed: Mar. 9, 2007

(65) Prior Publication Data
US 2007/0211320 A1 Sep. 13, 2007

(30) Foreign Application Priority Data

Mar. 10, 2006 (JP) ................. 2006-065756
May 12, 2006 (JP) ................. 2006-134436

(51) Int. Cl.
*G03H 1/12* (2006.01)
(52) U.S. Cl. ............... 359/11; 359/21; 359/35
(58) Field of Classification Search ............. 359/11, 359/21, 35
See application file for complete search history.

(56) References Cited

U.S. PATENT DOCUMENTS 5,940,514 A * 8/1999 Heanue et al. ............ 713/193
7,088,482 B2 * 8/2006 Edwards ................... 359/11

FOREIGN PATENT DOCUMENTS

| JP | SHO 51-007946 | 1/1976 |
| JP | 2000-284672 | 10/2000 |
| JP | 2004-226821 | 8/2004 |
| WO | 2004/102542 | 11/2004 |

OTHER PUBLICATIONS

Japanese Office Action issued on May 6, 2010, corresponding to Japanese Patent Appln. No. 2006-134436.

* cited by examiner

*Primary Examiner* — Audrey Y Chang
(74) *Attorney, Agent, or Firm* — K&L Gates LLP

(57) ABSTRACT

A hologram recording apparatus includes a signal-beam spatial light modulating section, a reference-beam spatial light modulating section, and a control unit. A signal beam pattern generates a signal beam. A reference beam pattern generates a reference beam. The control unit controls the shapes of the two beam patterns. A data-recording signal beam pattern is displayed on the signal-beam spatial light modulating section and a data-recording reference beam pattern is displayed on the reference-beam spatial light modulating section so that a data-recording hologram is formed in a predetermined area of a holographic recording medium. An encryption signal beam pattern for encrypting the data-recording hologram is displayed on the signal-beam spatial light modulating section and an encryption reference beam pattern is displayed on the reference-beam spatial light modulating section so that an encryption hologram is formed in the same area as the predetermined area of the holographic recording medium.

13 Claims, 10 Drawing Sheets

FIG. 11A
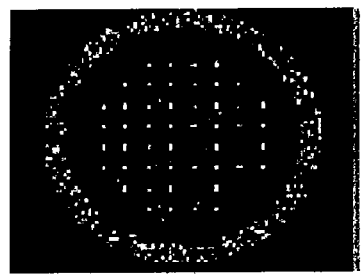
FIG. 11B	FIG. 11C	FIG. 11D
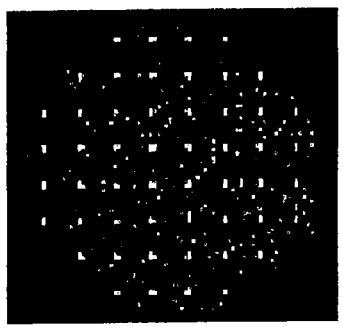  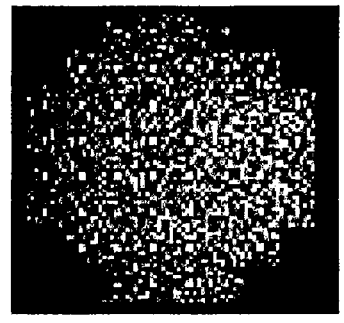

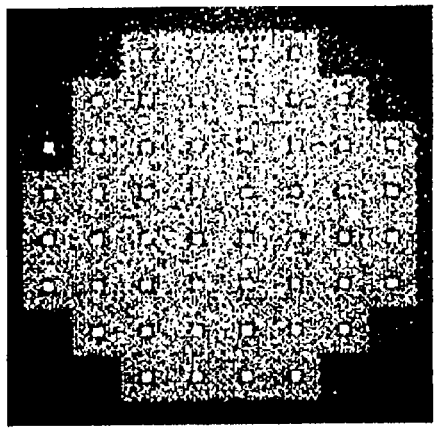
FIG. 12C1
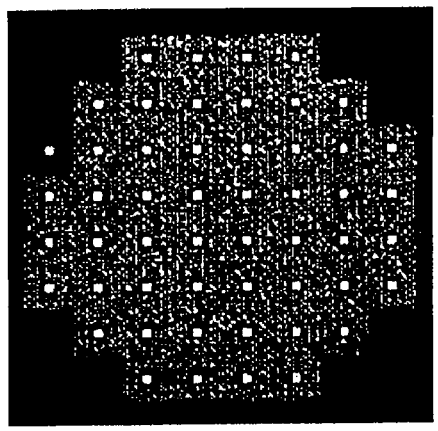
FIG. 12B1
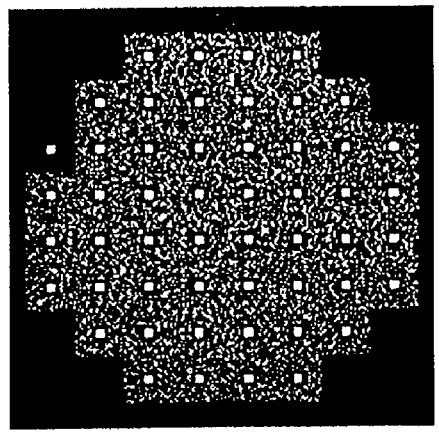
FIG. 12A1
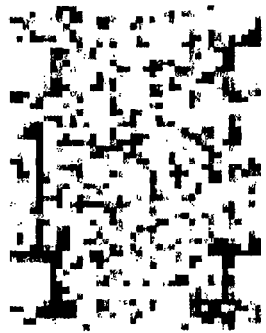
FIG. 12C2
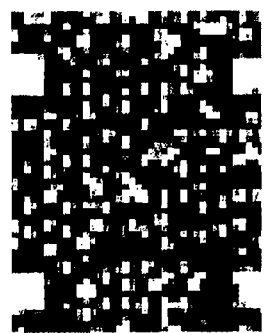
FIG. 12B2
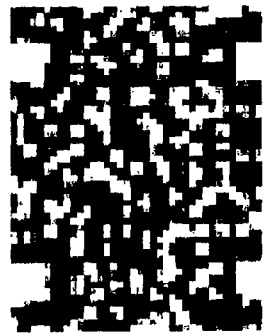
FIG. 12A2

HOLOGRAM RECORDING APPARATUS AND HOLOGRAM RECONSTRUCTION APPARATUS

CROSS REFERENCES TO RELATED APPLICATIONS

The present application claims priority to Japanese Patent Application JP 2006-065756 filed in the Japanese Patent Office on Mar. 10, 2006, and Japanese Patent Application JP 2006-134436 filed in the Japanese Patent Office on May 12, 2006, the entire contents of which are incorporated herein by reference.

BACKGROUND

The present application relates to a hologram recording apparatus and a hologram reconstruction apparatus.

In recent years, holographic memories serving as recording and reconstruction apparatuses capable of recording data at high density and reconstructing the data at a high transfer rate have been developed. The holographic memories utilize the thickness direction of a recording medium. When recording data, the holographic memories generate interference fringes between a reference light beam and a signal light beam according to data to be recorded in which information is two-dimensionally arranged as a page. The holographic memories three-dimensionally record the interference fringes therein at a time. When reconstructing the data, the holographic memories emit the reference light beam to the generated hologram so as to obtain a diffracted light beam. Thus, the holographic memories reconstruct the recorded data from the diffracted light beam (refer to, for example, Japanese Unexamined Patent Application Publication No. 2004-226821 and Nikkei Electronics, Jan. 17, 2005, pp. 106-114).

Holographic recording media can store a significantly large amount of recorded data compared with existing recording media. Accordingly, if a third party can easily read confidential recorded data out of the holographic recording media, leakage of a significantly large amount of confidential information or personal information could happen. That is, the risk of leakage of confidential data causing serious problems has become greater than ever before. Therefore, cipher technology that prevents a third party from reading recorded data on holographic recording media is desired. However, a cipher technology using the features of hologram recording and reconstruction has not yet been developed.

SUMMARY

The present application provides a hologram recording apparatus having a cipher capability that uses the features of hologram recording and reconstruction and a hologram reconstruction apparatus for reconstructing data recorded on a holographic recording medium by such a hologram recording apparatus.

According to an embodiment, a hologram recording apparatus that records a hologram in a recording layer of a holographic recording medium by causing a signal light beam modulated in accordance with data to be recorded to interfere with a reference light beam is provided. The signal light beam and the reference light beam are emitted from the same light source. The hologram recording apparatus includes a signal-beam spatial light modulating section on which a signal light beam pattern for generating the signal light beam is displayed, a reference-beam spatial light modulating section on which a reference light beam pattern for generating the reference light beam is displayed, and a control unit for controlling the shape of the signal light beam pattern displayed on the signal-beam spatial light modulating section and the shape of the reference light beam pattern displayed on the reference-beam spatial light modulating section. A data-recording signal light beam pattern serving as a signal light beam pattern in accordance with the data to be recorded is displayed on the signal-beam spatial light modulating section, and a data-recording reference light beam pattern identified so as to correspond to the data-recording signal light beam pattern is displayed on the reference-beam spatial light modulating section so that a data-recording hologram is formed in a predetermined area of the recording layer. An encryption signal light beam pattern serving as a signal light beam pattern for encrypting the data-recording hologram is displayed on the signal-beam spatial light modulating section, and an encryption reference light beam pattern having a shape different from the data-recording reference light beam pattern is displayed on the reference-beam spatial light modulating section so that an encryption hologram is formed in the same area as the predetermined area of the recording layer.

The hologram recording apparatus records a hologram in a recording layer of a holographic recording medium by causing a signal light beam modulated in accordance with data to be recorded to interfere with a reference light beam. The signal light beam and the reference light beam are emitted from the same light source. The hologram recording apparatus includes a signal-beam spatial light modulating section, a reference-beam spatial light modulating section, and a control unit. A signal light beam pattern for generating the signal light beam is displayed on the signal-beam spatial light modulating section. A reference light beam pattern for generating the reference light beam is displayed on the reference-beam spatial light modulating section. The control unit controls the shape of the signal light beam pattern displayed on the signal-beam spatial light modulating section and the shape of the reference light beam pattern displayed on the reference-beam spatial light modulating section. A data-recording signal light beam pattern serving as a signal light beam pattern in accordance with the data to be recorded is displayed on the signal-beam spatial light modulating section, and a data-recording reference light beam pattern identified so as to correspond to the data-recording signal light beam pattern is displayed on the reference-beam spatial light modulating section so that a data-recording hologram is formed in a predetermined area of the recording layer. An encryption signal light beam pattern serving as a signal light beam pattern for encrypting the data-recording hologram is displayed on the signal-beam spatial light modulating section, and an encryption reference light beam pattern having a shape different from the data-recording reference light beam pattern is displayed on the reference-beam spatial light modulating section so that an encryption hologram is formed in the same area as the predetermined area of the recording layer. In this way, the encryption hologram is overwritten to the data-recording hologram in the same area of the recording layer of the holographic recording medium. Therefore, the recorded data cannot be reconstructed unless the reference light beam used at a recording time is used.

According to another embodiment, a hologram reconstruction apparatus that reconstructs data recorded in a holographic recording medium using a diffracted light beam obtained by emitting a reference light beam into an area of the holographic recording medium is provided. The area includes a data-recording hologram formed in accordance with the recorded data by causing a signal light beam emitted from the same light source as that of the reference light beam to interfere with the reference light beam and an encryption hologram formed using a signal light beam and a reference light beam different from the signal light beam and the reference light beam used for forming the data-recording hologram. The hologram reconstruction apparatus includes data-recording reference light beam pattern acquiring means for acquiring information about a data-recording reference light beam pattern for generating a reference light beam that is the same as the reference light beam used for recording the recorded data and a reference-beam spatial light modulating section on which the data-recording reference light beam pattern is displayed in accordance with the information about the data-recording reference light beam pattern acquired by the data-recording reference light beam pattern acquiring means. The recorded data is reconstructed from the data-recording hologram.

The hologram reconstruction apparatus reconstructs data recorded in a holographic recording medium using a diffracted light beam obtained by emitting a reference light beam into an area of the holographic recording medium. The area includes a data-recording hologram formed in accordance with the recorded data by causing a signal light beam emitted from the same light source as that of the reference light beam to interfere with the reference light beam and an encryption hologram formed using a signal light beam and a reference light beam different from the signal light beam and the reference light beam used for forming the data-recording hologram. The data-recording reference light beam pattern acquiring means acquires information about a data-recording reference light beam pattern for generating a reference light beam that is the same as the reference light beam used for recording the recorded data. The data-recording reference light beam pattern is displayed on the reference-beam spatial light modulating section in accordance with the information about the data-recording reference light beam pattern acquired by the data-recording reference light beam pattern acquiring means. In this way, the recorded data is reconstructed from the data-recording hologram overwritten to the same area of the recording layer of the holographic recording medium.

According to an embodiment, a hologram recording apparatus having cipher capability can be provided. In addition, a hologram reconstruction apparatus that reconstructs data recorded on a holographic recording medium by such a hologram recording apparatus can be provided.

Additional features and advantages are described herein, and will be apparent from, the following Detailed Description and the figures.

BRIEF DESCRIPTION OF THE FIGURES

FIGS. 11A-11D illustrate reconstructed images generated on the image sensor when a hologram recorded without encryption is reconstructed using a reference light beam that is the same as the one used at a recording time, a reference light beam that has no correlation with the one used at a recording time, and an all-white reference light beam; and FIG. 12A1-12C2 illustrate reconstructed images generated on the image sensor when a hologram recorded with encryption is reconstructed using a reference light beam that is the same as the one used at a recording time, a reference light beam that has no correlation with the one used at a recording time, and an all-white reference light beam.

DETAILED DESCRIPTION

A coaxial hologram recording and reconstruction apparatus including a coaxial optical system is briefly described as an example of a hologram recording and reconstruction apparatus first according to an embodiment. Thereafter, the principal of an encryptor used in the hologram recording and reconstruction apparatus and particular examples of the encryptor are sequentially described according to an embodiment.

Holographic Recording and Reconstruction Apparatus Using Coaxial Method

In a hologram recording and reconstruction apparatus using the coaxial method, a signal light beam and a reference light beam, which are described below, share part of a light path. Accordingly, recording and reconstruction can be performed using a single objective lens, resulting in a simple optical system. Furthermore, since the compatibility with existing compact discs (CDs) and digital versatile discs (DVDs) can be easily realized, a hologram recording and reconstruction apparatus using the coaxial method has recently attracted attention for next-generation apparatuses.

Figure 1:
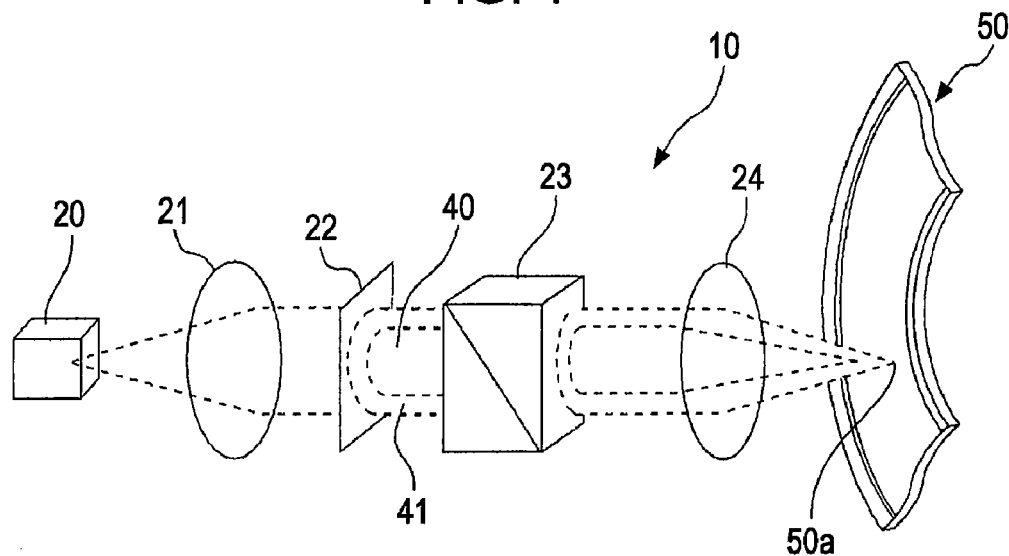
FIG. 1 is a conceptual illustration of a coaxial optical system used in a holographic recording apparatus using a coaxial method.

FIG. 1 is a conceptual illustration of a coaxial optical system 10 used in a holographic recording apparatus using a coaxial method. The coaxial optical system 10 includes the following optical components: a laser light source 20, a collimating lens 21, a spatial light modulator 22 including a transmissive liquid crystal, a beam splitter 23, and an objective lens 24.

Figure 2:
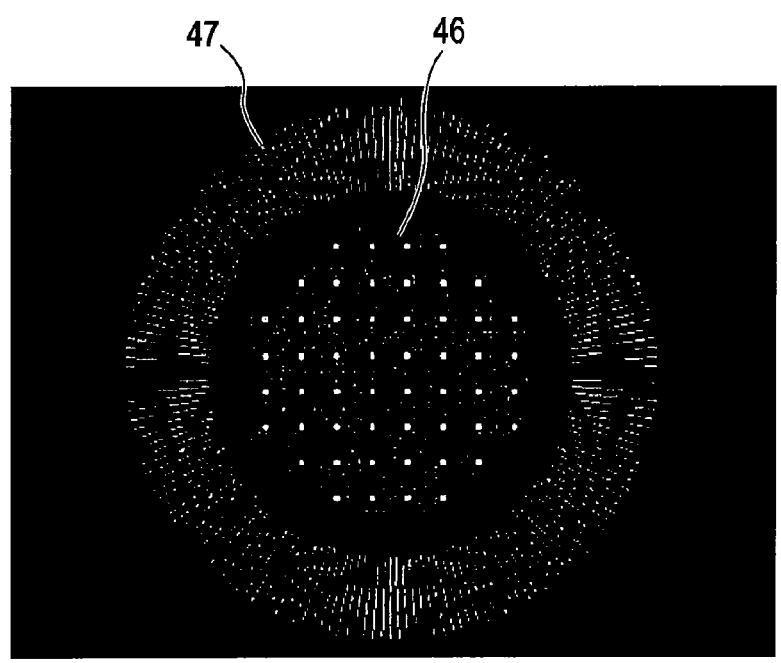
FIG. 2 illustrates examples of a signal light beam pattern and a reference light beam pattern displayed on a spatial light modulator.

A light beam emitted from the laser light source 20 is transformed to a parallel light beam by the collimating lens 21 and passes through the spatial light modulator 22. As shown in FIG. 2, the spatial light modulator 22 includes two sections through which the light beam passes: a signal-beam spatial light modulating section 46 that displays signal light beam pattern on the basis of data to be recorded and a reference-beam spatial light modulating section 47 that displays a reference light beam pattern. The light beam passes through the signal-beam spatial light modulating section 46 and the reference-beam spatial light modulating section 47 so as to be separated into a signal light beam 40 and a reference light beam 41 having the same center line and being coaxially disposed. The signal light beam 40 and the reference light beam 41 pass through the beam splitter 23 and the objective lens 24 along the same optical path and are made incident on a recording layer 50a of a holographic recording medium 50 (see FIG. 4). The signal light beam 40 generated by the signal-beam spatial light modulating section 46 interferes with the reference light beam 41 generated by the reference-beam spatial light modulating section 47 in the recording layer 50a. Since the index of refraction of a small area in the recording layer 50a changes in accordance with the interference state, the data is recorded in the form of a diffraction grating (hologram) in accordance with the pattern of the index of refraction.

FIG. 2 illustrates an example of a pattern formed by the signal light beam 40 and the reference light beam 41 displayed on the spatial light modulator 22. In this pattern, a signal light beam pattern is displayed in the signal-beam spatial light modulating section 46 disposed in the center area whereas a reference light beam pattern is displayed in the reference-beam spatial light modulating section 47 so as to surround the signal light beam pattern. In FIG. 2, a black portion (a dark portion) blocks a light beam whereas a white portion (a bright portion) allows a light beam to be transmitted therethrough. Thus, the signal light beam 40 and the reference light beam 41 change in accordance with the arrangement of the black portions and the white portions.

FIG. 2 illustrates an example of the data-recording reference light beam pattern having a spoke shape. However, the pattern may be a random pattern having white portions randomly spatially arranged in accordance with random numbers generated in advance. Alternatively, the pattern may be a pattern created by scanning personal information (e.g., a fingerprint) using an image sensor (not shown) and processing the fingerprint using a predetermined method.

Figure 3:
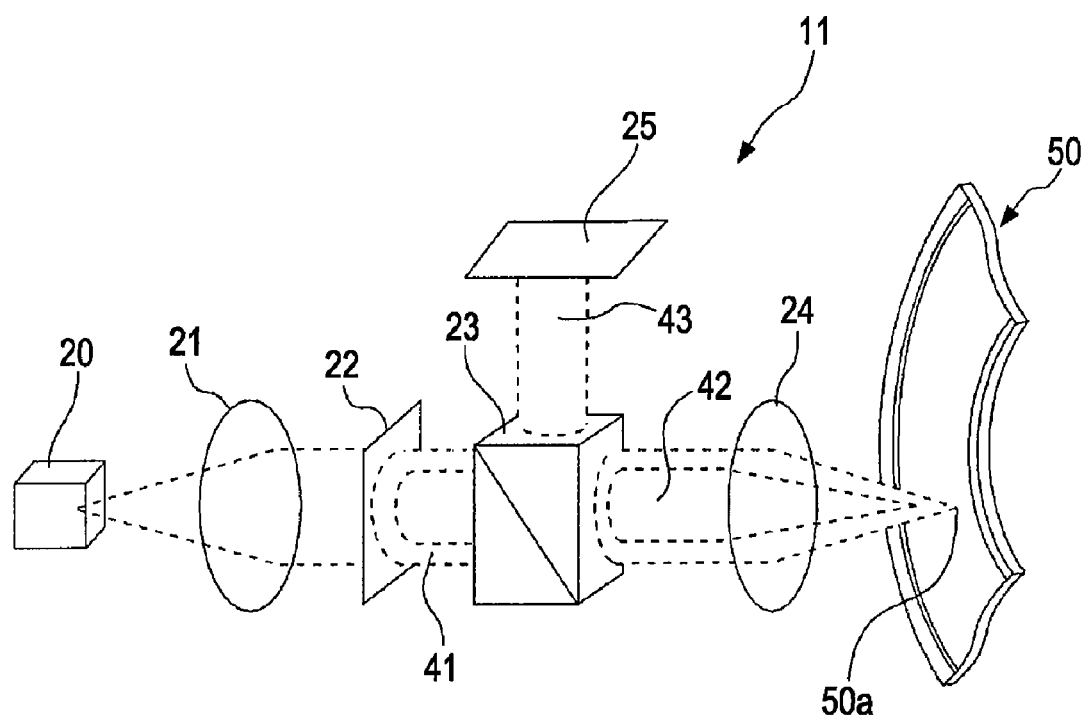
FIG. 3 is a conceptual illustration of a coaxial optical system used in a holographic reconstruction apparatus using the coaxial method.

FIG. 3 is a conceptual illustration of a coaxial optical system 11 used in a holographic reconstruction apparatus using a coaxial method. The hologram reconstruction apparatus using the coaxial method includes the above-described laser light source 20, the collimating lens 21, the spatial light modulator 22, the beam splitter 23, and an objective lens 24. In addition, the hologram reconstruction apparatus using the coaxial method includes an image sensor 25 including, for example, a charged coupled device (CCD).

To reconstruct recorded data, only the reference light beam pattern is displayed in the reference-beam spatial light modulating section 47 of the spatial light modulator 22 whereas an all-black pattern (a pattern having only a black portion that blocks a light beam) is displayed in the signal-beam spatial light modulating section 46. The coaxial optical system 11 allows the reference light beam 41 propagating from the reference-beam spatial light modulating section 47 to pass through the beam splitter 23 and the objective lens 24. Subsequently, the reference light beam 41 is made incident on a hologram formed in the recording layer 50a of the holographic recording medium 50 to reconstruct the recorded data. Here, this reference light beam 41 generates a diffracted light beam 42 in accordance with the shape of the hologram. The propagation direction of the diffracted light beam 42 is changed by the beam splitter 23. Thereafter, the diffracted light beam 42 illuminates the image sensor 25 as a reconstructed light beam (diffracted light beam) 43. Since an electrical signal output from the image sensor 25 is a signal in accordance with the shape of the hologram (i.e., the recorded data), a control unit 60 can reconstruct the recorded data from this electrical signal.

Here, the hologram recording and reconstruction apparatus (an apparatus capable of recording and reconstructing holographic data) includes the structures of both the coaxial optical system 10 and the coaxial optical system 11. That is, the hologram recording and reconstruction apparatus includes a structure similar to that of the coaxial optical system 11. When recording data, as shown in FIG. 2, the spatial light modulator 22 can display a signal light beam pattern in the signal-beam spatial light modulating section 46 and a reference light beam pattern in the reference-beam spatial light modulating section 47 surrounding the signal-beam spatial light modulating section 46. When reconstructing the data, the spatial light modulator 22 displays the reference light beam pattern in the reference-beam spatial light modulating section 47 and the above-described all-black pattern in the signal-beam spatial light modulating section 46 so that the signal-beam spatial light modulating section 46 does not pass a light beam therethrough. In this way, the hologram recording and reconstruction apparatus can record and reconstruct data. The shape (state) of pattern displayed on the spatial light modulator 22 is controlled by a control signal output from the control unit 60.

Figure 4:
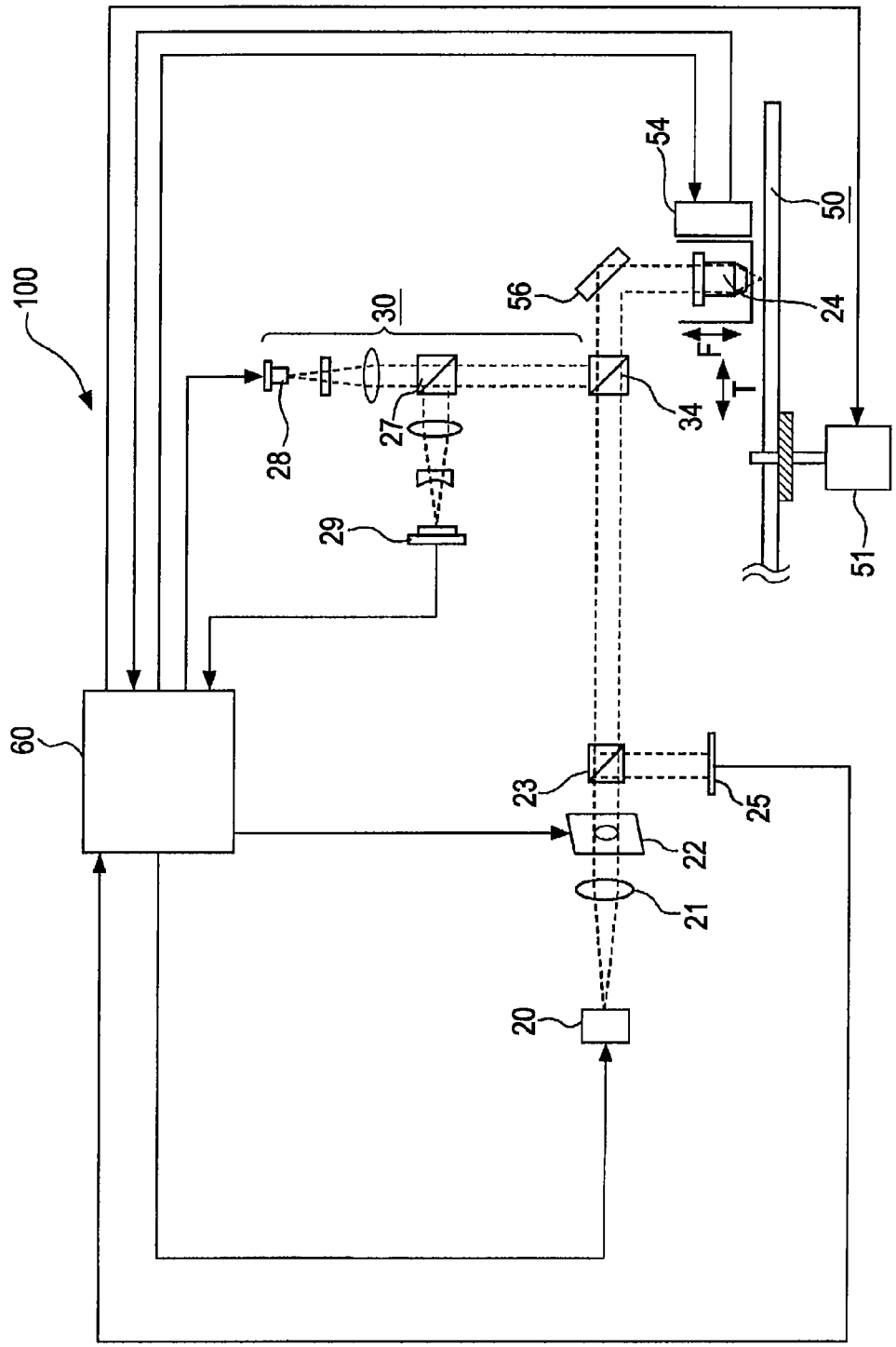
FIG. 4 is a schematic illustration of a hologram recording and reconstruction apparatus including an optical unit as a main part.

FIG. 4 is a schematic illustration of a hologram recording and reconstruction apparatus 100 including an optical unit as a main part. Similar components illustrated in the foregoing description are designated by similar reference numerals, and therefore, descriptions are not repeated.

The hologram recording and reconstruction apparatus 100 includes a servo optical system 30. Only key components of the servo optical system 30 are designated by reference numerals and are briefly described. A servo light source 28 emits a servo light beam. Unlike the wavelength of the recording and reconstruction light beam emitted from the recording and reconstruction laser light source 20, the wavelength of the servo light beam (e.g., a red laser beam) is long so that the servo laser beam can be separated from the recording and reconstruction light beam.

A beam splitter 27 guides a returning light beam from the holographic recording medium 50 to a photodetector 29. The photodetector 29 partitions a detector for a focus servo into a plurality of areas in a manner suitable for the astigma method and partitions a detector for a radial (tracking) servo into a plurality of areas in a manner suitable for the push-pull method. A dichroic mirror 34 is an optical component that is shared by the servo optical system 30 and the recording and reconstruction optical system. The dichroic mirror 34 serves as a wavelength separating element that separates a servo light beam from a light beam for recording and reconstructing data. A reflecting mirror 56 changes the propagation directions of the servo light beam and the recording and reconstruction light beam towards the objective lens 24. In addition, the reflecting mirror 56 changes the propagation directions of diffracted light beams from an address groove 50c (see FIG. 5) and the hologram towards the servo optical system 30 and the recording and reconstruction optical system, respectively.

A spindle motor 51 rotates the holographic recording medium 50 having a disc shape similar to the shape of the existing CD or DVD about the geometric center of the disc-shaped holographic recording medium 50. The rotation of the holographic recording medium 50 is controlled by a control signal output from the control unit 60.

The operation of the hologram recording and reconstruction apparatus 100 is briefly described next. The recording operation of the hologram recording and reconstruction apparatus 100 is described first.

A light beam emitted from the laser light source 20 passes through the collimating lens 21 and is made incident on the spatial light modulator (SLM) 22. Here, a pattern displayed on the spatial light modulator 22 is similar to the pattern shown in FIG. 2. This pattern includes a pattern for the signal-beam spatial light modulating section 46 and the reference-beam spatial light modulating section 47. To record data on the holographic recording medium 50, the spatial light modulator 22 displays a signal light pattern for generating a signal light beam in the signal-beam spatial light modulating section 46 on the basis of data to be recorded. In addition, the spatial light modulator 22 displays a reference light pattern for generating a reference light beam in the reference-beam spatial light modulating section 47. Here, in the hologram recording and reconstruction apparatus 100 using the coaxial method, the spatial light modulator 22 includes both the signal-beam spatial light modulating section 46 and the reference-beam spatial light modulating section 47, which are formed in the same plane forming the area of the spatial light modulator 22 in accordance with control to be performed by the control unit 60.

Each of the signal light beam and the reference light beam passes through the beam splitter 23 and the dichroic mirror 34. Subsequently, each of the signal light beam and the reference light beam is reflected by the reflecting mirror 56. The beam size of each of the signal light beam and the reference light beam is changed to a size suitable for recording and reconstructing data by the objective lens 24. Thereafter, each of the signal light beam and the reference light beam is projected onto the holographic recording medium 50. The signal light beam and the reference light beam overlap in the recording layer 50a of the holographic recording medium 50 so as to form a hologram (see FIG. 5). Thus, the data is recorded on the holographic recording medium 50.

In this case, the light beam for recording and reconstructing data is controlled by the focus and radial servo systems including the servo optical system 30 so as to be focused on the recording layer 50a of the holographic recording medium 50 at a predetermined location in the radial direction. In addition, a spindle servo system including the spindle motor 51 controls the holographic recording medium 50 to have a predetermined rotation angle. The light beam output from the servo optical system 30 is reflected off the dichroic mirror 34 and the reflecting mirror 56. Subsequently, the light beam passes through the objective lens 24 and is made incident on the holographic recording medium 50. In contrast, the light beam output from the recording and reconstruction optical system passes through the dichroic mirror 34 and is reflected off the reflecting mirror 56. Subsequently, the light beam passes through the objective lens 24 and is made incident on the holographic recording medium 50. Note that, in the hologram recording and reconstruction apparatus 100 using the coaxial method, all the signal light beam, reference light beam, and diffracted light beam pass through the objective lens 24.

The holographic recording medium 50 has the address groove 50c used for positioning the recording and reconstructing light beam and the servo light beam. The servo optical system 30 has a structure similar to that for existing CDs and DVDs and can detect the positions of the recording and reconstructing light beam and the servo light beam on the holographic recording medium 50 on the basis of an electrical signal output from the photodetector 29. That is, a relationship between the recording and reconstructing light beam and the servo light beam is uniquely determined by the positional relationship among the optical components of the recording and reconstructing optical systems and the servo optical system 30. Accordingly, by determining the positional relationship between the servo light beam and the holographic recording medium 50 by the above-described focus and radial servo system and spindle servo system, the positional relationship between the recording and reconstructing light beam and the servo light beam can be controlled.

That is, signals such as a focus error signal and a tracking error signal are detected from the photodetector 29 of the servo optical system 30. Subsequently, a focus tracking servo circuit (not shown) in the control unit 60 controls the objective lens actuator 54 including a focus actuator and a tacking actuator on the basis of these error signals so that the objective lens 24 is displaced in the directions designated by the reference symbols "F" and "T" shown in FIG. 4. Thus, each of the servo light beam and the recording and reconstruction light beam are emitted to the target location on the holographic recording medium 50.

While the foregoing description has been made with reference to the hologram recording and reconstruction apparatus 100 having data recording and reconstructing capabilities shown in FIG. 4, the hologram recording and reconstruction apparatus 100 may be configured without the reconstruction capability (e.g., the image sensor 25). Alternatively, the hologram recording and reconstruction apparatus 100 may be configured without the recording capability (e.g., the signal-beam spatial light modulating section 46).

Structure of Hologram Recording Medium

Figure 5:
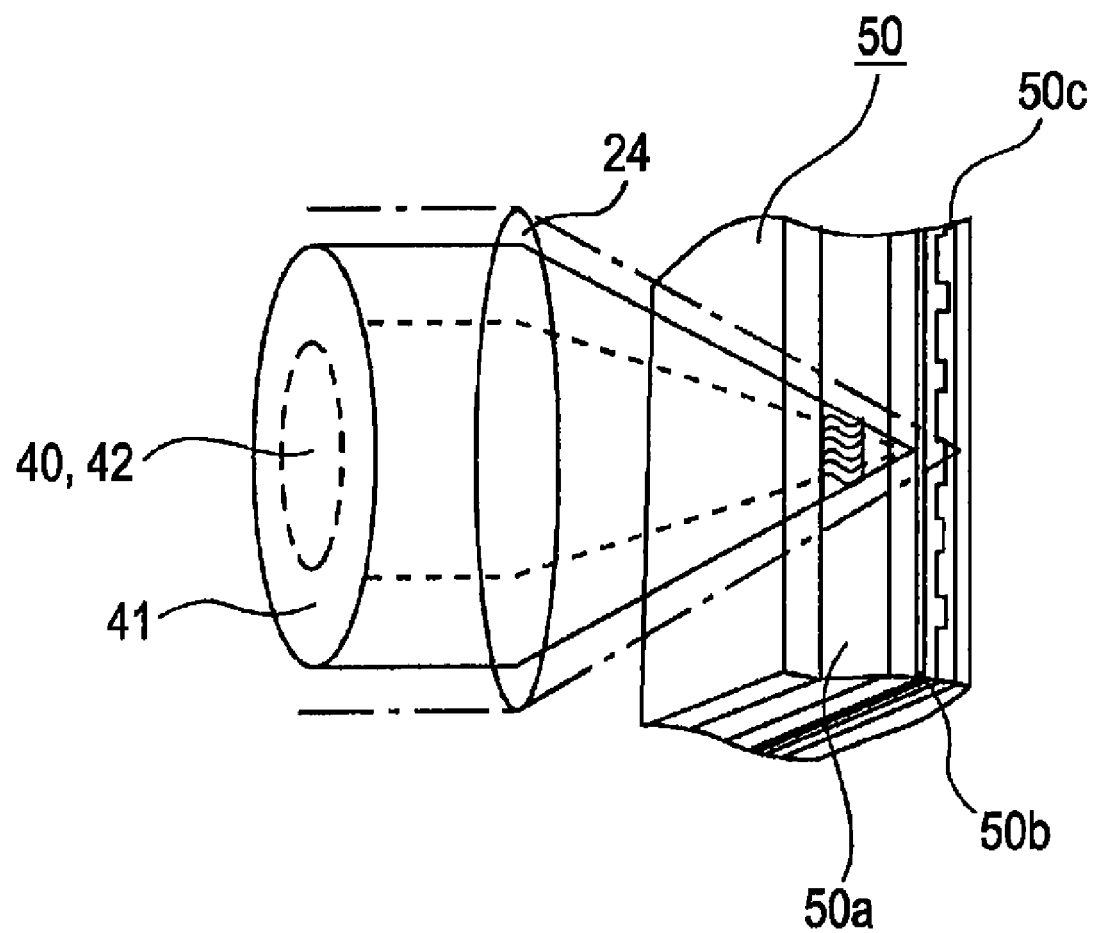
FIG. 5 is a schematic illustration of the cross-sectional structure of a holographic recording medium.

FIG. 5 is a schematic illustration of the cross-sectional structure of the holographic recording medium 50. FIG. 5 further illustrates how the following light beams are made incident on the objective lens 24: the signal light beam 40 and the diffracted light beam 42 (light beams passing through a portion inside an area indicated by a dotted line), the reference light beam 41 (a light beam passing through a portion between the area indicated by the dotted line and an area indicated by a solid line), and a servo light beam (a light beam passing through a portion inside an area indicated by an alternate long and short dash line). The holographic recording medium 50 includes the recording layer 50a, a reflecting film 50b for reflecting the recording and reconstructing light beam, and the address groove 50c.

When data is recorded, a hologram is formed in the recording layer 50a in accordance with the shape of interference fringes generated by the interference between the signal light beam 40 and the reference light beam 41. When the data is reconstructed, only the reference light beam 41 is emitted onto the hologram and the diffracted light beam 42 in accordance with the hologram is reflected by the reflecting film 50b in the portion that is substantially the same as that of the recording signal light beam 40. The diffracted light beam 42 passes through the objective lens 24 to form an image on the image sensor 25. In contrast, the servo light beam passes through the reflecting film 50b having a wavelength selectivity and is reflected off an aluminum reflecting film having the address groove 50c thereon. By means of the same principle utilized for CDs and DVDs, the control unit 60 can acquire error signals for the above-described servos, such as the focus servo, the radial servo, and the spindle servo on the basis of electrical signals detected from the photodetector 29 of the servo optical system 30. In addition, the control unit 60 can acquire an address signal for identifying the position to which the light beam is emitted on the recording layer 50a of the holographic recording medium 50.

Basic Concept of Encryption

In order to encrypt data to be recorded on such a holographic recording medium, for example, a random phase mask, such as a diffuser, or a phase modulator may be used so as to light-modulate a reference light beam. When the data is reconstructed, a reference light beam is generated using the same phase mask as used at the recording time or a reference light beam is light-modulated using a light modulator in the same manner as used at the recording time so as to obtain a diffracted light beam. Note that the random phase mask is a phase mask that provides light beams with a phase change without a spatial regularity in areas where the light beams pass through. For example, in the case of using a random phase mask, when the recorded data is reconstructed, a phase mask that is the same as that used at the recording time is required. Other phase masks cannot reconstruct the recorded data, and therefore, the effect of encryption is generated. As a result, the recorded information is protected against a third party that cannot use a phase mask that is the same as that used at the recording time. However, if a hologram recording apparatus is different from a hologram reconstruction apparatus, random phase masks having the same shape are required. The creation of such random phase masks is very difficult, which is problematic.

In addition, in the case of performing phase modulation for each of pages using a spatial phase modulator, a costly spatial phase modulator is required. Accordingly, it is difficult to provide a commercially available memory apparatus including a low-cost holographic recording medium and a low cost hologram recording and reconstruction apparatus with cipher capability.

Figure 6A:
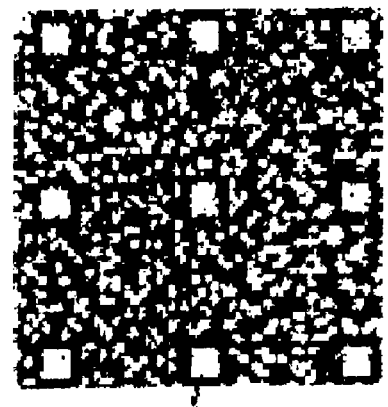
FIGS. 6A-6C illustrate examples of reconstructed images displayed on an image sensor when an all-white reference light beam pattern is used.
Figure 6B:
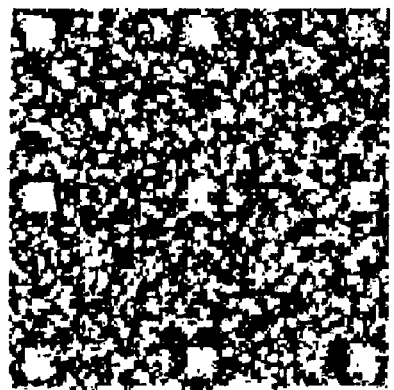
Figure 6B:
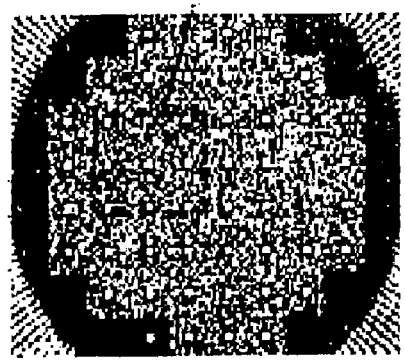
Figure 6B:
Figure 6C:

To clarify the concept of the encryption used in a hologram recording and reconstruction, examples of a reconstructed image displayed on the image sensor 25 when an all-white reference light beam pattern is used are illustrated in FIGS. 6A-C. In the hologram recording and reconstruction apparatus 100 shown in FIG. 4, data is recorded using the reference light beam pattern shown in FIG. 2. The recorded data is reconstructed using a reference light beam pattern that is the same as that used at the recording time. The reconstructed image of the data obtained on the image sensor 25 is shown in FIG. 6A. The lower image illustrates the entire reconstructed image whereas the upper image illustrates an enlarged portion of the lower image. In contrast, FIG. 6B illustrates a reconstructed image obtained on the image sensor 25 using a reference light beam having an all-white pattern (a pattern of the reference-beam spatial light modulating section 47 through which an entire light beam passes) shown in FIG. 6C. In FIG. 6B, the lower image illustrates the entire reconstructed image whereas the upper image illustrates an enlarged portion of the lower image.

As can be clearly seen from a comparison between FIGS. 6A and 6B, when the reference light beam pattern used for reconstruction is all white, the reference light beam is emitted over a wider area of the hologram than that when the reference light beam used at the recording time is used. Accordingly, an extra diffracted light beam that does not contribute to the reconstruction of the recorded data is generated, and therefore, noise increases due to the extra diffracted light beam. However, the reconstructed image shown in FIG. 6B still maintains the shape similar to the reconstructed image shown in FIG. 6A. That is, in general, the possibility of demodulating the recorded data from the diffracted light beam when the reference light beam pattern is all white is high. This is because widely used hologram recording and reconstruction apparatuses employ an error correction code, and therefore, the hologram recording and reconstruction apparatuses can perfectly reconstruct the recorded data if the number of errors falls within a predetermined range. Accordingly, even when the black-and-white reference light beam pattern displayed in the reference-beam spatial light modulating section 47 is determined to be a special one, the recorded data is easily reconstructed, as noted above. Thus, when hologram recording and reconstruction are performed, encryption that prevents a third party from collecting information stored on the holographic recording medium cannot be achieved.

Definition of Terms

To continue to describe a signal light beam pattern and a reference light beam pattern used for encryption in more detail, the term "no correlation" is used for describing the concept of a relationship between a reference light beam pattern and another reference light beam pattern. The term "non-correlation" refers to a state in which both portions of a reference light beam pattern and another reference light beam pattern displayed in the reference-beam spatial light modulating section 47 at the same display position (a pixel that is present at the same position of a reference light beam pattern and another reference light beam pattern) are not white (a pixel that transmits a light beam). The term "non-correlation" is used for not only reference light beam patterns but also reference light beams generated by such reference light beam patterns. Furthermore, the term "non-correlation" is used for a relationship between a signal light beam pattern and another signal light beam pattern. Still furthermore, the term "non-correlation" is used for a relationship between signal light beams generated by such signal light beam patterns.

As used herein, the term "white ratio" refers to a ratio of the number of white pixels to the total number of pixels of the spatial light modulator 22 when the reference light beam pattern is represented by binary information of a black portion (pixels that block a light beam) and a white portion. Additionally, when the white ratio of a reference light beam pattern at a recording time of data is 1, the white ratio of an encryption reference light beam pattern is referred to as a "standardized white ratio". The terms "white ratio" and "standardized white ratio" are also used for describing a signal light beam pattern.

As used herein, the term "M/#" (M number) refers to an indicator related to overwriting on a holographic recording medium. As M/# increases, the number of allowed overwritings on the same area can be increased.

In addition, the terms "data-recording signal light beam pattern" and "encryption signal light beam pattern" are used. The term "data-recording signal light beam pattern" refers to a signal light beam pattern displayed in the signal-beam spatial light modulating section 46 of the spatial light modulator 22 in accordance with the data to be recorded. The term "encryption signal light beam pattern" refers to a signal light beam pattern displayed in the signal-beam spatial light modulating section 46 of the spatial light modulator 22 for encryption. Furthermore, the terms "data-recording reference light beam pattern" and "encryption reference light beam pattern" are used. The term "data-recording reference light beam pattern" refers to a reference light beam pattern displayed in the reference-beam spatial light modulating section 47 of the spatial light modulator 22 together with the data-recording signal light beam pattern. The term "encryption reference light beam pattern" refers to a reference light beam pattern displayed in the reference-beam spatial light modulating section 47 of the spatial light modulator 22 together with the encryption signal light beam pattern.

In addition, the terms "data-recording hologram" and "encryption hologram" are used. The term "data-recording hologram" refers to a hologram formed in a predetermined area of a recording layer by displaying the data-recording reference light beam pattern formed so as to correspond to the data-recording signal light beam pattern in the reference-beam spatial light modulating section 47 while displaying the data-recording signal light beam pattern, which is a signal light beam pattern produced in accordance with data to be recorded, in the signal-beam spatial light modulating section

46. The term "encryption hologram" refers to a hologram formed in a predetermined area of a recording layer by displaying the encryption reference light beam pattern formed so as to correspond to the encryption signal light beam pattern in the reference-beam spatial light modulating section 47 while displaying the encryption signal light beam pattern, which is a signal light beam pattern for encrypting the data-recording hologram, in the signal-beam spatial light modulating section 46. The predetermined area in which the data-recording hologram is formed is the same as the predetermined area in which the encryption hologram is formed.

In addition, hereinafter, the term "pixel" is used in association with the spatial light modulator and the image sensor. The term "pixel" refers to each of a plurality of areas obtained by partitioning a light receiving area of the special light modulator 22 or the image sensor. From the viewpoint of the operation of the control unit 60, the term "pixel" refers to a range of a minimum unit with which the control unit 60 can instruct the spatial light modulator to control the shape of the signal light beam pattern or the reference light beam pattern and with which the control unit can retrieve a reconstructed image from the image sensor.

In addition, hereinafter, the term "symbol" is used. The term "symbol" refers to a unit composed of a plurality of pixels two-dimensionally arranged on the spatial light modulator. For example, one "symbol" is formed from a set consisting of pixels arranged in 4 columns and 4 rows. A block code (digital data) having a predetermined bit string length corresponds to the one symbol. The term "symbol" also refers to a unit composed of a plurality of pixels two-dimensionally arranged on the image sensor. In addition to the above-described terms, some terms that are not general terms are used hereinbelow. These terms are briefly described each time a new term is introduced.

Concept of Cryptography According to Present Embodiment

Figure 7A:
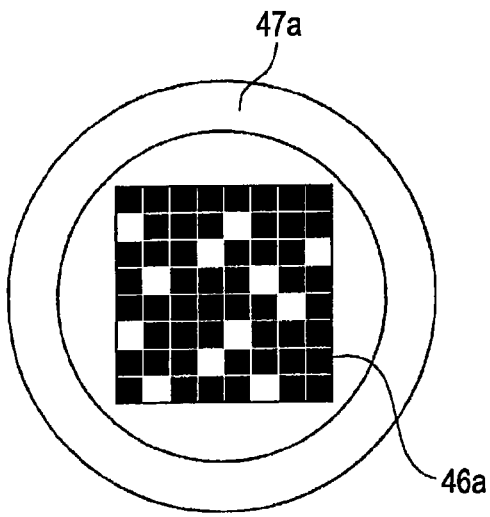
FIGS. 7A and 7B are schematic illustrations of encrypting steps.
Figure 7B:
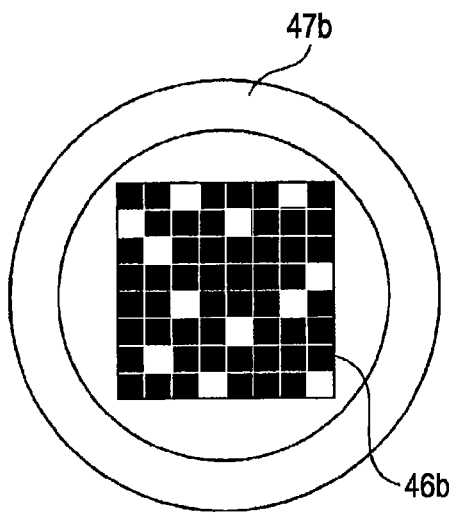
Figure 8A:
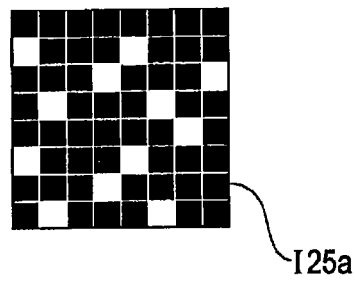
FIGS. 8A and 8B are schematic illustrations of decrypting steps.
Figure 8B:
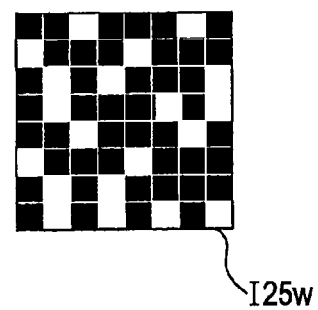

The concept of cryptography (a process of data to be recorded on a holographic recording medium) according to the present embodiment is described next with reference to FIGS. 7A, 7B, 8A, and 8B. FIGS. 7A and 7B are schematic illustrations of encrypting steps whereas FIGS. 8A and 8B are schematic illustrations of decrypting steps.

FIG. 7A is a schematic illustration of four symbols of a signal light beam pattern 46a displayed on the spatial light modulator 22. In the center area of the drawing, part of the signal light beam pattern 46a is schematically shown. In a peripheral area surrounding the center area, an area in which a reference light beam pattern 47a is to be displayed is schematically shown. FIG. 7B is a schematic illustration of a signal light beam pattern 46b displayed on the spatial light modulator 22 and different from the signal light beam pattern 46a illustrated in FIG. 7A. In the center area of the drawing, part of the signal light beam pattern 46b is schematically shown. In a peripheral area surrounding the center area, an area in which a reference light beam pattern 47b is to be displayed is schematically shown. Here, the reference light beam pattern 47a has no correlation with the reference light beam pattern 47b. The signal light beam pattern 46a is a data-recording signal light beam pattern. The reference light beam pattern 47a is a data-recording reference light beam pattern. The signal light beam pattern 46b is an encryption signal light beam pattern. The reference light beam pattern 47b is an encryption reference light beam pattern. The following description is made with this assumption.

Encryption is made using these two pairs consisting of the signal light beam pattern and the reference light beam pattern displayed on the spatial light modulator 22 as follows. A signal light beam pattern including the signal light beam pattern 46a and the reference light beam pattern 47a shown in FIG. 7A are displayed on the spatial light modulator 22 so that a hologram (a data-recording hologram) is formed in the recording layer 50a of the holographic recording medium 50. Subsequently, a signal light beam pattern including the signal light beam pattern 46b and the reference light beam pattern 47b shown in FIG. 7B are displayed on the spatial light modulator 22 so that a hologram (an encryption hologram) is formed in the area where the hologram (the data-recording hologram) formed by the signal light beam pattern including the signal light beam pattern 46a and the reference light beam pattern 47a shown in FIG. 7A is present. By overwriting the data to the same area at least twice, as described above, the recording operation of encrypted data is completed. Here, the reference light beam pattern 47a has no correlation with the reference light beam pattern 47b.

A decryption process (steps of reconstructing data from a holographic recording medium) is described next. FIG. 8A is a schematic illustration of a partial reconstructed image (four symbols) I25a on the image sensor 25. The reconstructed image I25a is obtained by emitting a reference light beam generated by the reference light beam pattern 47a onto an encrypted (overwritten) hologram in the above-described manner. FIG. 8B is a schematic illustration of a partial reconstructed image I25w on the image sensor 25. The reconstructed image I25w is obtained by emitting a reference light beam generated by the all-white reference light beam pattern (see FIG. 6C) onto the encrypted hologram.

When FIG. 8A is compared with FIG. 7A, it is found that the signal light beam pattern 46a displayed on the spatial light modulator 22 shown in FIG. 7A can be completely reconstructed from the reconstructed image I25a shown in FIG. 8A. That is, the data-recording signal light beam pattern can be completely reconstructed, and therefore, the control unit 60 can completely reconstruct the recorded data by processing an electrical signal output from the image sensor 25. In contrast, in the reconstructed image I25w, the signal light beam pattern 46a and the signal light beam pattern 46b are mixed. Therefore, it is difficult to acquire a reconstructed image of the signal light beam pattern 46a from this mixed reconstructed image. Consequently, it is difficult to reconstruct the recorded data.

In addition, consider the case where the following reference light beam pattern is used for the above-described encrypted hologram in place of the all-white reference light beam pattern at a reconstruction time: a signal light beam pattern (a random pattern) having a correlation with the reference light beam pattern 47a and the reference light beam pattern 47b and having substantially the same number of overlapped white portions for these two reference light beam patterns. Even in such a case, a signal pattern in which the signal light beam pattern 46a and the signal light beam pattern 46b are mixed is reconstructed. Therefore, it is difficult to reconstruct the signal light beam pattern 46a, and thus, the recorded data.

Reference Light Beam Pattern

From the foregoing description, it can be seen that it is desirable that, when encryption is made using a data-recording reference light beam pattern and an encryption reference light beam pattern, the data-recording reference light beam pattern has no correlation with the encryption reference light beam pattern. The reason for this is as follows. The signal light beam pattern 46a (i.e., the data-recording reference light beam pattern) can be completely reconstructed, as shown in FIG. 8A, since the data-recording reference light beam pattern has no correlation with the encryption reference light beam pattern. When the correlated portion (i.e., the portion in which the white portions of the two reference light beams overlap) is reconstructed using the data-recording reference light beam, the diffracted light beam output from the hologram formed by the encryption signal light beam pattern becomes noise, and therefore, the quality of the reconstruction signal (i.e., the reconstruction characteristic) deteriorates.

Additionally, it is desirable that the white ratio of the encryption signal light beam pattern is the same as that of the data-recording reference light beam pattern. The reason for this is as follows. When information is reconstructed using, for example, an all-white reference light beam pattern, information obtained from reconstruction of the data-recording signal light beam pattern and information obtained from reconstruction of the encryption signal light beam pattern are reconstructed. At that time, the power of the diffracted light beam is changed in accordance with the intensity of the reference light beam (i.e., the number of bright pixels). Consequently, the data-recording signal light beam pattern may be distinguished from the encryption signal light beam pattern due to the changed power. In contrast, if the white ratios of the encryption signal light beam pattern and the data-recording reference light beam pattern are substantially the same, it is difficult to distinguish between the information obtained from reconstruction of the data-recording signal light beam pattern and the information obtained from reconstruction of the encryption signal light beam pattern. Therefore, decryption of the encrypted information is made more difficult.

From a perspective different from the encrypting feature, the white ratio of the reference light beam is a key factor relating to M/#. To provide a holographic recording medium with a large capacity, M/# needs to be somewhat large. That is, in an encryption process according to the present embodiment, to form a hologram, different holograms are overwritten in the same area. Accordingly, if M/# is small, the number of multiplexes available in a multiple recording mode is more restricted than in known methods. Therefore, it is important that the size of the hologram forming area is reduced. If the white ratio of the reference light beam is large, M/# is decreased, and therefore, the available number of multiplexes is decreased (hereinafter this decrease is referred to as "large consumption of M/#"). In contrast, if the white ratio of the reference light beam is small, M/# is increased, and therefore, the available number of multiplexes is increased (hereinafter this increase is referred to as "small consumption of M/#").

However, if the white ratio is decreased to too small a value, the effect of the encryption is decreased. Therefore, the number of pixels of the white portion of the reference light beam pattern needs to be somewhat large so that the encryption is not disturbed. Accordingly, it is desirable that the white ratio is set to a minimal value in the range that can provide the effect of encryption without increasing the consumption of M/#. Here, it is desirable that the range of the above-described standardized white ratio is, for example, from 1.5 to 0.1. This desirable range of the standardized white ratio is set under the assumption that the white portion of the reference light beam pattern on the spatial light modulator 22 completely transmits a light beam. However, instead of restricting the number of pixels of the white portion, the spatial light modulator 22 may set the transmittance of the white portion of the encryption reference light beam pattern to be smaller than that of the white portion of the data-recording reference light beam pattern so that the consumption of M/# is decreased. For example, a desirable range of the white ratio of the data-recording reference light beam pattern is from 0.01 to 0.5.

Signal Light Beam Pattern

A relationship between the data-recording signal light beam pattern and the encryption signal light beam pattern is described in more detail next. The signal light beam pattern is generated by spatially modulating data to be recorded on the basis of a predetermined format. Here, the predetermined format includes a scheme for providing an address, a scheme for correcting an error, and a scheme for spatially modulating data to be recorded. For example, according to the present embodiment, the scheme for spatially modulating data to be recorded is represented by a block code having a predetermined bit length corresponding to 16 pixels. Three pixels out of the 16 pixels form a white portion (a portion that allows a light beam to pass therethrough). Such a block code is referred to as a "16:3 code". An encryption signal light beam pattern is described next when information is recorded using a 16:3 code.

Figure 9A:
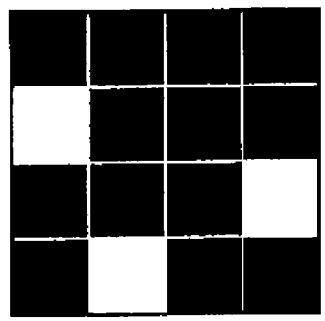
FIGS. 9A-9E illustrate signal light beam patterns for encryption.

FIG. 9A illustrates a data-recording signal light beam pattern generated in accordance with data to be recorded on the spatial light modulator 22. A white portion represents a portion that allows a light beam to be transmitted therethrough whereas a black portion represents a portion that blocks a light beam. FIGS. 9B to 9E illustrate reconstructed images generated on the image sensor 25 by the diffracted light beam when the reference-beam spatial light modulating section 47 is all white and an all-white reference light beam pattern is used. To obtain the reconstructed images shown in FIGS. 9B to 9E, different encryption signal light beam patterns (not shown) are used.

Figure 9B:
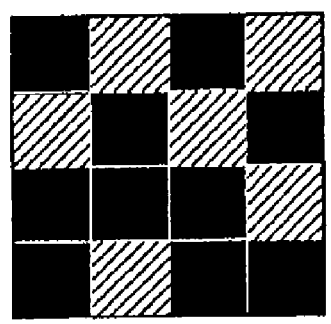
Figure 9C:
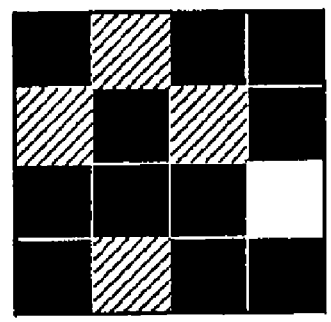
Figure 9D:
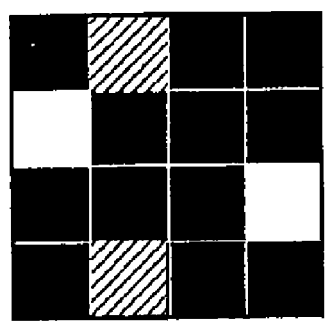
Figure 9E:
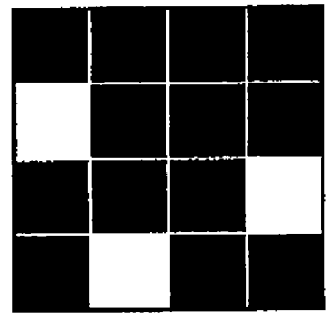

FIG. 9B illustrates a reconstructed image displayed on the image sensor 25 and generated by the diffracted light beam from an area where the encryption hologram and the data-recording hologram are double-recorded when the positions of all the white pixels of the data-recording signal light beam pattern and the encryption signal light beam pattern displayed on the spatial light modulator 22 are different (i.e., when neither of two pixels located at the same position is white). FIG. 9C illustrates a reconstructed image generated on the image sensor 25 by the diffracted light beam from an area where the encryption hologram and the data-recording hologram are double-recorded when the position of one white pixel of the data-recording signal light beam pattern is the same as the position of one white pixel of the encryption signal light beam pattern. FIG. 9D illustrates a reconstructed image generated on the image sensor 25 by the diffracted light beam from an area where the encryption hologram and the data-recording hologram are double-recorded when the positions of two white pixels of the data-recording signal light beam pattern are the same as the positions of two white pixels of the encryption signal light beam pattern. FIG. 9E illustrates a reconstructed image generated on the image sensor 25 by the diffracted light beam from an area where the encryption hologram and the data-recording hologram are double-recorded when the positions of three white pixels of the data-recording signal light beam pattern are the same as the positions of three white pixels of the encryption signal light beam pattern. In these cases, at a recording time, the encryption reference light beam pattern has no correlation with the data-recording reference light beam pattern.

In FIGS. 9B and 9E which schematically illustrates part of the reconstructed image on the image sensor 25, the white portions receive an amount of light (light luminance) substantially double that received by the shaded portions (the portions with hatchings), and the black portions receive no light. A correspondence between the image generated on the image sensor 25 and the image displayed on the spatial light modulator 22 is described next. Each of the shaded portions corresponds to a portion where the position (pixel) of a white portion of the data-recording signal light beam pattern is not coincident with the position of a white portion of the encryption signal light beam pattern (i.e., a pixel located at one position of the spatial light modulator 22 turns white only when one of the two signal light beam patterns is displayed). Each of the white portions corresponds to a portion where the position (pixel) of a white portion of the data-recording signal light beam pattern is coincident with the position of a white portion of the encryption signal light beam pattern (i.e., a pixel located at one position of the spatial light modulator 22 turns white when one of the two signal light beam patterns is displayed). As described earlier, when the information is reconstructed using an all-white reference light beam pattern, the white portion of the reconstructed image shown in FIG. 9E has a color (not shown) slightly close to black due to noise whereas the black portion has a color (not shown) slightly close to white due to noise.

Although not shown in FIGS. 9A to 9E, the encryption signal light beam patterns corresponding to the patterns displayed on the spatial light modulator 22 shown in FIGS. 9B to 9E can be determined as follows. In each of the patterns shown in FIGS. 9B to 9E, the shaded portions except for the ones each located at the same position as a white portion of FIG. 9A is changed to a white portion. The white portions remain as white portions. The other portions are changed to black portions. For example, the white portions of FIG. 9B indicate that white pixels of the data-recording signal light beam pattern shown in FIG. 9A and white pixels of the encryption signal light beam pattern (not shown) displayed on the spatial light modulator 22 are located in those portions. The shaded portions indicate that white pixels of either one of the data-recording pattern and the encryption signal light beam pattern displayed on the spatial light modulator 22 are located in those portions. That is, in the encryption signal light beam pattern corresponding to FIG. 9B, white portions are located at cells of the second column from the left and the first row from the top, the third column from the left and the second row from the top, and the fourth column from the left and the first row from the top. Additionally, in the encryption signal light beam pattern corresponding to FIG. 9C, white portions are located at cells of the second column from the left and the first row from the top, the third column from the left and the second row from the top, and the fourth column from the left and the third row from the top. In the encryption signal light beam pattern corresponding to FIG. 9D, white portions are located at cells of the first column from the left and the second row from the top, the second column from the left and the first row from the top, and the fourth column from the left and the third row from the top. In the encryption signal light beam pattern corresponding to FIG. 9E, white portions are located at cells of the first column from the left and the second row from the top, the second column from the left and the fourth row from the top, and the fourth column from the left and the third row from the top.

In a decryption method for obtaining recorded data from an image on the image sensor 25, as shown in FIGS. 9B to 9E, in general, sixteen data items (one symbol) output from the pixels are input to an A/D converter. Three data items having the top three highest levels (i.e., the luminance levels) are selected from among the sixteen data items. Subsequently, the locations of the three data items are found to decrypt the recorded data. In such a method, in the case of FIG. 9B, the locations of three items out of six items are identified, and therefore, encryption is excellently performed. However, in the case of FIG. 9D, the locations of three items out of four items are identified, and therefore, for recorded data corresponding to one symbol reconstructed from the sixteen data items, the data-recording signal light beam pattern before encryption is performed can be reconstructed with a fifty percent success rate. That is, the effect of encryption is reduced.

That is, in order to obtain a reconstructed image that is difficult to be decrypted on the image sensor 25, as shown in FIG. 9B, it is the most desirable that a data-recording signal light beam pattern has no correlation with the encryption signal light beam pattern. Furthermore, as described above, it is desirable that a data-recording reference light beam pattern has no correlation with the encryption reference light beam pattern at a recording time.

Here, to make a data-recording signal light beam pattern have no correlation with the encryption signal light beam pattern, an encryption signal light beam pattern having no correlation with another encryption signal light beam pattern may be used for each page. However, a spatial modulation scheme is performed using a block code. Accordingly, every time sixteen data items corresponding to the data-recording signal light beam pattern are input, sixteen data items for displaying an uncorrelated encryption signal light beam pattern obtained from the input sixteen data items can be easily acquired in a simple manner. In this case, if a table including all of the correspondence between uncorrelated code and one-symbol data to be recorded is stored in a read only memory (ROM) in the control unit 60, this conversion can be easily performed. In addition, to make a data-recording reference light beam pattern have no correlation with the encryption reference light beam pattern, an encryption reference light beam pattern having no correlation with a data-recording reference light beam pattern for the entire area of the encryption reference light beam pattern displayed on the spatial light modulator 22 may be prestored in the ROM since the data-recording reference light beam pattern is known in advance.

Alternatively, instead of using the ROM, the control unit 60 may sequentially generate a set of three random numbers each in the range of 1 to 16, and a random pattern in which the positions indicated by the random numbers are white. In this case, although the noncorrelation is not ensured, and therefore, the effect of encryption deteriorates compared with the case where the noncorrelation is ensured, a sufficient effect of encryption can be achieved. In addition, like the reference light beam, as the number of white portions of the encryption signal light beam pattern is decreased, the effect of encryption decreases. However, since consumption of M/# can be decreased, the number of the white portions out of sixteen portions may be less than or equal to three (e.g., two). That is, an encryption signal light beam pattern can be selected on the basis of only the relationship with the data-recording signal light beam pattern unless an encryption hologram formed by using the encryption signal light beam pattern is used for reconstructing useful meaningful information. Accordingly, it is easy to make the encryption signal light beam pattern have no correlation with the data-recording signal light beam pattern or reduce a correlation level. Here, as the number of pixels of the encryption signal light beam pattern and data-recording signal light beam at the same locations being white increases, the correlation level is higher.

Number of Encryption Information Items

While the method for recording one encryption signal light beam pattern for one data-recording signal light beam pattern has been described with reference to FIGS. 9B to 9E, the number of the encryption signal light beam patterns may be two or more. In such a case, the white ratio and M/# of the data-recording signal light beam pattern and the encryption signal light beam pattern restrict the number of encryption signal light beam patterns. However, as the number of encryption signal light beam patterns is increased, the effect of encryption increases.

Spatial Distribution of Encryption

Figure 10:
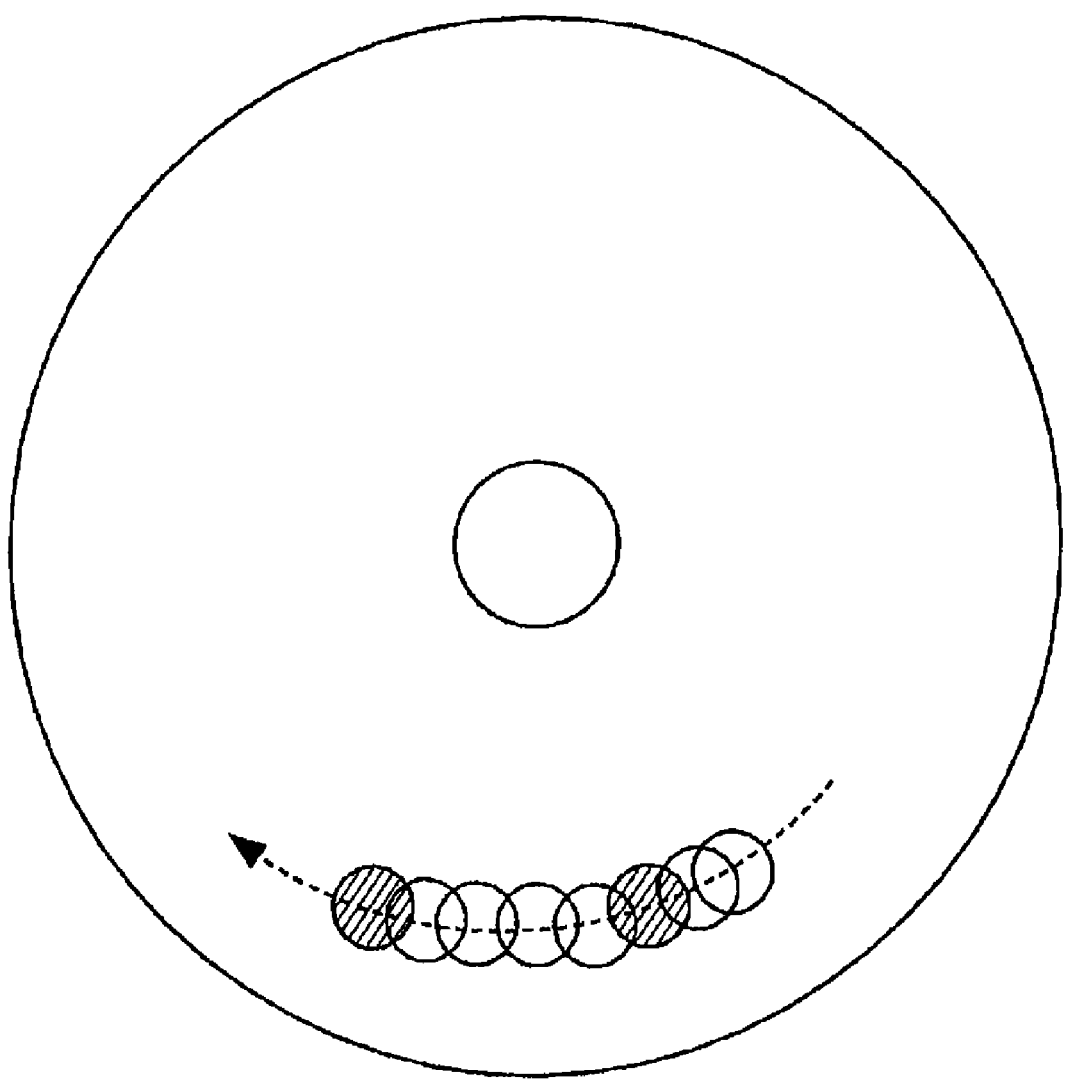
FIG. 10 is a diagram in which pages to be encrypted are spatially distributed.

The encryption signal light beam pattern may be recorded for all of the pages. However, as described earlier, to reduce the consumption of M/#, pages to be encrypted may be spatially distributed at predetermined intervals (e.g., every five pages), as shown in FIG. 10. The predetermined interval may be one of 2 pages to 1000 pages. In this case, the other non-encrypted pages can be reconstructed. However, if an inter-page interleave is applied and the period of the interleave is set to be long, the effect of encryption can be obtained even when the predetermined interval is set to be long. In this way, the effect of encryption can be achieved without reducing the capacity of the holographic recording medium too much. In addition, a predetermined verification pattern for reconstructing data may be stored in the inner peripheral portion of the holographic recording medium 50 and an encryption pattern may be recorded in that portion to prevent the reconstruction of the verification pattern.

Order of Recording Encryption Information

To record an encryption hologram in the same area as the data-recording hologram, the encryption hologram may be double-recorded immediately after the data-recording hologram is recorded. Alternatively, the data-recording hologram may be double-recorded immediately after the encryption hologram is recorded. In this way, since the ambient temperatures when the data-recording hologram and the encryption hologram are recorded are the same, the data-recording hologram can be easily separated from the encryption hologram. That is, a change in the shape of the data-recording hologram is substantially the same as that of the encryption hologram. In addition, the effects of environmental changes (e.g., a difference between the temperature at a recording time and the temperature at a reconstruction time) on the data-recording hologram are substantially the same as those on the encryption hologram. As noted above, when the encryption hologram may be double-recorded immediately after the data-recording hologram is recorded, encryption is ideally performed with high precision, and therefore, the quality (the S/N ratio) of reconstructed information is improved.

Alternatively, a plurality of data-recording holograms may be sequentially recorded. Thereafter, an encryption hologram may be written to each area where the data-recording hologram is formed. In this way, the data-recording holograms are written in high speed. Thereafter, in a spare time period (a time period in which neither recording nor reconstruction is performed), the encryption holograms are written. Thus, recording time can be reduced.

Alternatively, encryption holograms may be written to the holographic recording medium 50 at predetermined locations in advance. Thereafter, a data-recording hologram may be written into the area where each encryption hologram is formed. In this way, since only a data-recording hologram is written into the area where each encryption hologram is formed, the recording speed can be increased.

In the above-described double recording, an encryption hologram needs to be written to substantially the same area where the data-recording hologram has been recorded in the recording layer 50*a*, or a data-recording hologram needs to be written to substantially the same area where the encryption hologram has been recorded in the recording layer 50*a*. It is desirable that the allowance of positional deviation between the two areas is, for example, less than or equal to 1 μm. Therefore, the recording position is detected by a servo method.

Data-Recording Reference Light Beam Pattern

When data is recorded into a hologram using a data-recording signal light beam pattern, a fixed data-recording reference light beam pattern may be used. However, the data-recording reference light beam pattern may be changed in accordance with the recording time, the recording location on the holographic recording medium 50, or a predetermined order. In this way, the security is further improved. In such a case, it is desirable that an encryption reference light beam pattern used for encryption is also made variable so as to have no correlation with each data-recording reference light beam. Thus, the performance of encryption is further improved.

Countermeasure for Contraction at Recording Time

The recording layer 50*a* slightly contracts after a hologram is formed. To compensate for the contraction of the recording layer 50*a*, the wavelength of a light beam used for recording data using a data-recording signal light beam pattern may be changed from the wavelength of the light beam used for recording data using an encryption signal light beam pattern so that holograms recorded in accordance with the data-recording signal light beam pattern and the encryption signal light beam pattern are not effected by the contraction. In this case, either one of the data-recording signal light beam pattern or the encryption signal light beam pattern may be used for forming the hologram first. That is, the encryption hologram may be formed after the data-recording hologram has been formed. Alternatively, the data-recording hologram may be formed after the encryption hologram has been formed. However, an amount of change in the wavelength of the light beam is determined depending on which hologram is formed first. In the present embodiment, to change the wavelength of the light beam, a Littrow variable-wavelength laser light source or a Littman variable-wavelength laser light source is used.

Results of Experiments

The results of experiments of the present embodiment are shown in FIGS. 11 and 12. As the coding scheme of spatial modulation, the code (the 16:3 code) in which three out of sixteen pixels arranged in four columns and four rows were white was employed. The white ratio of a reference light beam was set to 1/3. FIG. 11A illustrates a data-recording signal light beam pattern and a data-recording reference light beam pattern displayed on the spatial light modulator 22.

FIG. 11B illustrates a reconstructed image generated on the image sensor 25 when non-encrypted recording (i.e., recording without double writing) is performed and recorded data is reconstructed using a reference light beam generated by a reference light beam pattern that is the same as a data-recording reference light beam pattern (a reference light beam that is the same as the one used at a recording time). FIG. 11C illustrates a reconstructed image generated on the image sensor 25 when non-encrypted recording is performed and the recorded data is reconstructed using a reference light beam pattern having no correlation with a data-recording reference light beam pattern (a reference light beam having no correlation with the one used at a recording time). FIG. 11D illustrates a reconstructed image generated on the image sensor 25 when non-encrypted recording is performed and the recorded data is reconstructed using a reference light beam generated by an all-white reference light beam pattern (an all-white reference light beam).

When reconstruction was performed using a reference light beam generated by a reference light beam pattern that is the same as a data-recording reference light beam pattern and one-symbol recorded data was a block code formed from sixteen pixels, 3 (symbol) errors were found among 1,632 symbols. When reconstruction was performed using a reference light beam generated by a reference light beam pattern that has no correlation with the data-recording reference light pattern, 1,632 errors occur in all the 1,632 symbols. When reconstruction was performed using a reference light beam generated by an all-white reference light beam pattern, 44 errors were found among the 1,632 symbols. In the case of these 44 errors, if recording is performed with error correction code, the errors can be corrected on the basis of the error correction code at a reconstruction time. As noted above, when non-encrypted recording is performed, the recorded data can be reconstructed regardless of what data-recording reference light beam pattern is employed.

In contrast, FIGS. 12A1 to 12C2 illustrate the results of the experiment when encrypted recording was performed. Here, to encrypt data to be recorded, a data-recording reference light beam pattern which had no correlation with an encryption reference light beam pattern was used. Similarly, a data-recording signal light beam pattern which had no correlation with an encryption signal light beam pattern was used. The number of encryptions was one. The recording area for encryption was the same area as the area for recording data. In such a case, FIG. 12A1 illustrates a reconstructed image generated on the image sensor 25 when reconstruction was performed using a reference light beam generated by a reference light beam pattern that is the same as the data-recording reference light beam pattern. FIG. 12A2 is an enlarged view of a partial area of the reconstructed image shown in FIG. 12A1. FIG. 12B1 illustrates a reconstructed image generated on the image sensor 25 when reconstruction was performed using a reference light beam generated by a reference light beam pattern that is the same as the encryption reference light beam pattern. FIG. 12B2 is an enlarged view of a partial area of the reconstructed image shown in FIG. 12B1. FIG. 12C1 illustrates a reconstructed image generated on the image sensor 25 when reconstruction was performed using a reference light beam generated by an all-white reference light beam pattern. FIG. 12C2 is an enlarged view of a partial area of the reconstructed image shown in FIG. 12C1.

When reconstruction was performed using a reference light beam generated by a reference light beam pattern that was the same as the data-recording reference light beam pattern, 15 errors occurred among 1,632 symbols. When reconstruction was performed using a reference light beam generated by a reference light beam pattern that was the same as the encryption reference light beam pattern, 1,632 errors occurred among all the 1,632 symbols. Additionally, when reconstruction was performed using a reference light beam generated by an all-white reference light beam pattern, 1,398 errors occurred among the 1,632 symbols.

Technical Fields Suitable for Employing Encryption Method According to Present Embodiment The above-described encryption method is effective for read only memory (ROM) type holographic recording media (hereinafter referred to as ROM holographic recording media) that record movies and music. In such usage, the ROM holographic recording media need to reconstruct recorded data without problems while protecting replication. In this method, when an electrical signal obtained by reconstructing recorded data stored on the ROM holographic recording medium without knowing a data-recording reference light beam pattern serving as key information, and the electrical signal is replicated on a disk, the replicated disk cannot be played back even when the data-recording reference light beam pattern is known later. The reason for this is as follows.

When the disk is replicated without knowing the data-recording reference light beam pattern serving as the key information, an electrical signal is demodulated from a reconstructed image on the image sensor 25 and is replicated on a new holographic recording medium by receiving diffracted light beams from both the data-recording hologram and an encryption hologram and forming the reconstructed image on the image sensor 25 in accordance with the diffracted light beams.

To accurately replicate the shape of an encrypted hologram, a hologram in accordance with the data-recording signal light beam pattern (a data-recording hologram) needs to be recorded by causing the data-recording signal light beam pattern to interfere with a reference light beam unique to the data-recording signal light beam pattern. In addition, a hologram in accordance with the encryption signal light beam pattern (an encryption hologram) needs to be recorded by causing the encryption signal light beam pattern to interfere with a reference light beam unique to the encryption signal light beam pattern. However, if the electrical signal demodulated in the above-described manner is recorded on a holographic recording medium, it is impossible to separate the recorded data using the data-recording signal light beam pattern any more.

Here, the data-recording reference light beam pattern may be stored in the hologram reconstruction apparatus. In such a case, to reconstruct recorded data from an overwritten hologram generated in the above-described encryption manner, only a hologram reconstruction apparatus that can generate the data-recording reference light beam pattern on the spatial light modulator thereof can reconstruct the recorded data from the encrypted hologram. That is, it is difficult for a widely used hologram recording and reconstruction apparatus of a third party that cannot generate the data-recording reference light beam pattern having a specific shape on the spatial light modulator thereof to reconstruct the recorded data.

Alternatively, only specific users, for example, an end user who paid a fee to know a download password or a developer who knows the download password in advance may download the data-recording reference light beam pattern over the Internet or the like so as to use that pattern when reconstructing the hologram.

As noted above, the data-recording reference light beam pattern may be stored in any location and may be distributed to a user in any way. However, by preventing a third party other than a specific user (or specific users) from knowing the data-recording reference light beam pattern, the encryption is effective for the third party.

As describe earlier, information about the data-recording reference light beam pattern can be acquired by a data-recording reference light beam pattern acquiring unit. According to the present embodiment, any one of the following configurations serves as the data-recording reference light beam pattern acquiring unit: a configuration in which the data-recording reference light beam pattern is stored in the ROM of the control unit 60 of the hologram recording and reconstruction apparatus 100 and the control unit 60 reads out this data-recording reference light beam pattern; a configuration in which the control unit 60 reads out the data-recording reference light beam pattern distributed over the Internet; and a configuration in which the data-recording reference light beam pattern is prestored in a predetermined area of a holographic recording medium and the control unit 60 reads out that data-recording reference light beam pattern.

Effect of Encryption

When recorded data is reconstructed from a hologram in which a data-recording hologram and an encryption hologram are overwritten in the above-described encryption manner, a third party who does not know the data-recording reference light beam pattern may attempt to decrypt the hologram by searching all of the reference light beams. In this case, the number of searches is given by the following expression:

$$\sum_{k=1}^{n} {}_N C_{N/k} \tag{1}$$

where N denotes the number of pixels for the reference light beam and n denotes the white ratio.

This number of searches is required for reconstructing one page. Therefore, if recorded data needs to be decrypted by changing the data-recording reference light beam pattern page by page, this search should be performed for every page. Thus, the decryption is made more difficult. In addition, to accurately decrypt one-symbol data serving as a block code on the basis of a reconstruction signal from the image sensor 25, since the one-symbol includes three white portions in accordance with the data-recording signal light beam pattern and three white portions in accordance with the encryption reference light beam pattern, twenty combinations are generated in total. Here, for example, one page includes 1,632 symbols, and therefore, patterns of 201,632 combinations are generated. Accordingly, it is almost impossible to identify which one of the combinations corresponds to three white portions in accordance with the data-recording signal light beam pattern. As a result, it is almost impossible to decrypt the encrypted data.

Modifications of Present Embodiment

Modifications of the above-described embodiment are described next. It is apparent that the number of multiplexes of the encrypted hologram can be two or more. As the number of multiplexes increases, the effect of the encryption increases.

However, if the number of multiplexes increases, it is difficult to select reference light beam patterns having no correlation with each other. At that time, it is the most desirable that the data-recording reference light beam pattern has no correlation with the encryption reference light beam pattern. However, if the data-recording reference light beam pattern has a low correlation with the encryption reference light beam pattern, although not zero, the encryption is sufficiently effective. Accordingly, by appropriately combining the number of multiplexes with the correlation level, the encryption suitable for the purpose can be performed.

In addition, while the above description has been made with reference to the area for multiplexes of the data-recording hologram identical to the area for multiplexes of the encryption hologram, the recording area of the data-recording hologram may be shifted from the recording area of the encryption hologram to achieve the effect of encryption. In known shift-multiplexing methods, if two holograms overlap by more than or equal to a predetermined amount, the performance of recording and reconstruction operations is difficult. However, the encryption method of the present embodiment can be applied to not only the generation of holograms in the same area but also the shift-multiplexing recording in which a hologram is slightly shifted. In this method, encrypted recording can be continuously performed while a holographic recording medium is slowly moving at all times. In addition, the recorded data can be reconstructed from the encrypted hologram areas.

Furthermore, the encryption signal light beam pattern can be determined so as to be suitable for not only the encryption but also useful meaningful information (useful meaningful encrypted data). Accordingly, the effect of encryption and the effect of multiplexes of the meaningful information can be obtained at the same time. That is, an encryption method in which M/# is not wasted can be achieved. In other words, in this encryption method, an encryption hologram in accordance with the useful meaningful information is recorded in the same area as the data-recording hologram. Even in such a case, it is desirable that reference light beam patterns having no correlation with each other are used.

In this encryption method, not only information about the data-recording reference light beam pattern but also information about the encryption reference light beam pattern functions as a key for decrypting the recorded data. Accordingly, if this encryption reference light beam pattern is unknown, it is difficult to successfully reconstruct the meaningful encrypted data. When a user who does not know the encryption reference light beam pattern reconstructs the recorded data using a pattern different from the encryption reference light beam pattern, information including a plurality of mixed multiplexing information items is reconstructed. Although all of the reconstructed patterns are used as signals, the recorded data cannot be reconstructed unless these patterns are separated. Consequently, highly secured encryption can be achieved.

In this case, if the reference light beam patterns have no correlation or a low correlation with each other, multiplex recording can be performed without restricting the signal light beam pattern (i.e., without restricting the meaningful encryption data), and the recorded data and the meaningful encryption data can be demodulated. For example, the control unit 60 can process the recorded data and the meaningful encryption data using the same signal processing procedure without distinction. However, to further improve the signal-to-noise (S/N) ratio and improve the recording and reconstruction characteristics, it is desirable that the signal light beam patterns have no correlation with each other. In such a case, in general, it is difficult that the encryption signal light beam pattern in accordance with meaningful information has no correlation with the data-recording signal light beam pattern. Accordingly, for example, it is desirable that the encryption signal light beam pattern has a minimal correlation with the data-recording signal light beam pattern. In addition, when two or more encryption signal light beam patterns are used, it is desirable that these encryption signal light beam patterns have a minimal correlation with each other. For example, by using a schema for generating a data-recording signal light beam pattern different from that for generating an encryption signal light beam pattern and a block code having a format of the encryption signal light beam pattern different from that of the data-recording signal light beam pattern, the non-correlation can be achieved.

To minimize the correlation among the signal light beam patterns, for example, when the 16:3 code is used, the redundancy of a pattern for one-symbol data is used so that a plurality of signal light beam patterns are assigned to the one-symbol data. The control unit 60 can determine the correlation between a pattern assigned to the recorded data (including 1 occurring when the redundancy is small and a plurality of patterns are not assigned to all the symbols) or a plurality of patterns and one or a plurality of patterns assigned to the meaningful encryption data. Subsequently, the control unit 60 can select a combination of the data-recording signal light beam pattern and the encryption signal light beam pattern having the lowest correlation level.

To obtain a non-correlation among the signal light beam patterns, for example, when the 16:3 code is used, the conversion scheme of the data to be recorded is set to 16:3 and the conversion scheme of the useful encryption data is set to 16:1 that represents a low information density. As a result, a plurality of encryption signal light beam patterns can be assigned to one symbol of the useful encryption data. Subsequently, the control unit 60 can determine the correlation level between one or a plurality of patterns assigned to the data to be recorded and a plurality of patterns assigned to the useful encryption data. Thereafter, the control unit 60 can select a combination of the data-recording signal light beam pattern and the encryption signal light beam pattern having the lowest correlation level so that the data-recording signal light beam pattern has no correlation with the encryption signal light beam pattern. Similarly, the encryption signal light beam patterns can have no correlation with each other.

Like the above-described case where information about the data-recording reference light beam pattern is acquired, information about the encryption signal light beam pattern is acquired by an encryption signal light beam pattern acquiring unit. According to the present embodiment, any one of the following configurations serves as the encryption signal light beam pattern acquiring unit: a configuration in which the encryption signal light beam pattern is stored in the ROM of the control unit 60 of the hologram recording and reconstruction apparatus 100 and the control unit 60 reads out this encryption signal light beam pattern; a configuration in which the control unit 60 reads out the encryption signal light beam pattern distributed over the Internet; and a configuration in which the encryption signal light beam pattern is prestored in a predetermined area of a holographic recording medium and the control unit 60 reads out that encryption signal light beam pattern.

It should be understood by those skilled in the art that various modifications, combinations, sub-combinations and alterations may occur depending on design requirements and other factors insofar as they are within the scope of the appended claims or the equivalents thereof.

For example, while the above embodiments have been described using the coaxial method in which a signal light beam and a reference light beam are coaxially aligned, the same technical concept can be applied to the two-light beam method in which a signal light beam and a reference light beam are made incident on a holographic recording medium through different optical components. In addition, for example, the same technical concept can be applied to a spatial light modulator of a transmissive type or a reflective type.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A hologram recording apparatus for recording a hologram in a recording layer of a holographic recording medium by causing a signal light beam modulated in accordance with data to be recorded to interfere with a reference light beam, the signal light beam and the reference light beam being emitted from the same light source, the hologram recording apparatus comprising:
   a signal-beam spatial light modulating section on which a signal light beam pattern for generating the signal light beam is displayed;
   a reference-beam spatial light modulating section on which a reference light beam pattern for generating the reference light beam is displayed; and
   a control unit for controlling the shape of the signal light beam pattern displayed on the signal-beam spatial light modulating section and the shape of the reference light beam pattern displayed on the reference-beam spatial light modulating section;
   wherein a data-recording signal light beam pattern serving as a signal light beam pattern in accordance with the data to be recorded is displayed on the signal-beam spatial light modulating section, and a data-recording reference light beam pattern identified so as to correspond to the data-recording signal light beam pattern is displayed on the reference-beam spatial light modulating section so that a data-recording hologram is formed in a predetermined area of the recording layer and wherein an encryption signal light beam pattern serving as a signal light beam pattern for encrypting the data-recording hologram is displayed on the signal-beam spatial light modulating section, and an encryption reference light beam pattern having a shape different from the data-recording reference light beam pattern is displayed on the reference-beam spatial light modulating section so that an encryption hologram is formed in the same area as the predetermined area of the recording layer, wherein the data-recording hologram and the encryption hologram are overwritten in said predetermined area to form an encrypted hologram.

2. The hologram recording apparatus according to claim 1, wherein at least one pixel of the reference-beam spatial light modulating section for displaying the encryption reference light beam pattern and the data-recording reference light beam pattern neither transmits nor reflects a light beam emitted from the light source.

3. The hologram recording apparatus according to claim 1, wherein at least one pixel of the signal-beam spatial light modulating section for displaying the encryption signal light beam pattern and the data-recording signal light beam pattern neither transmits nor reflects a light beam emitted from the light source.

4. The hologram recording apparatus according to claim 1, wherein the data-recording signal light beam pattern and the encryption signal light beam pattern displayed on the signal-beam spatial light modulating section represent a spatial block code defined for each of a plurality of areas of the signal-beam spatial light modulating section having a predetermined constant size.

5. The hologram recording apparatus according to claim 1, further comprising:
   an objective lens for allowing the signal light beam and the reference light beam to pass therethrough; and
   a spatial light modulator including the signal-beam spatial light modulating section and the reference-beam spatial light modulating section in the same plane.

6. The hologram recording apparatus according to claim 1, wherein the encryption hologram is formed after the data-recording hologram is formed.

7. The hologram recording apparatus according to claim 1, wherein the data-recording hologram is formed after the encryption hologram is formed.

8. The hologram recording apparatus according to claim 1, wherein the wavelength of the light source is changed so that the deformation of the recording layer, occurring after one of the encryption hologram and the data-recording hologram is formed first, and subsequently, the other one of the encryption hologram and the data-recording hologram is formed, is suppressed.

9. The hologram recording apparatus according to claim 1, wherein the encryption reference light beam pattern has no correlation with the data-recording reference light beam pattern.

10. The hologram recording apparatus according to claim 1, wherein the encryption reference light beam pattern is formed based at least in part on predetermined information or a predetermined algorithm.

11. A hologram reconstruction apparatus for reconstructing data recorded in a holographic recording medium using a diffracted light beam obtained by emitting a reference light beam into an area of the holographic recording medium, the area including an encrypted hologram formed by overwriting a data-recording hologram and an encryption hologram, said data-recording hologram formed in accordance with the recorded data by causing a signal light beam emitted from the same light source as that of the reference light beam to interfere with the reference light beam and said encryption hologram formed using a signal light beam and a reference light beam different from the signal light beam and the reference light beam used for forming the data-recording hologram, the hologram reconstruction apparatus comprising:

data-recording reference light beam pattern acquiring means for acquiring information about a data-recording reference light beam pattern for generating a reference light beam that is the same as the reference light beam used for recording the recorded data; and a reference-beam spatial light modulating section on which the data-recording reference light beam pattern is displayed in accordance with the information about the data-recording reference light beam pattern acquired by the data-recording reference light beam pattern acquiring means;

wherein the recorded data is reconstructed from the data-recording hologram.

12. The hologram reconstruction apparatus according to claim 11, further comprising:

reference light beam pattern acquiring means for acquiring information about a reference light beam pattern for generating a reference light beam different from the reference light beam for generating the data-recording hologram;

wherein useful meaningful information is reconstructed from the encryption hologram.

13. A hologram reconstruction apparatus for reconstructing data recorded in a holographic recording medium using a diffracted light beam obtained by emitting a reference light beam into an area of the holographic recording medium, the area including an encrypted hologram formed by overwriting a data-recording hologram and an encryption hologram, said data-recording hologram formed in accordance with the recorded data by causing a signal light beam emitted from the same light source as that of the reference light beam to interfere with the reference light beam and said encryption hologram formed using a signal light beam and a reference light beam different from the signal light beam and the reference light beam used for forming the data-recording hologram, the hologram reconstruction apparatus comprising:

a data-recording reference light beam pattern acquiring unit configured to acquire information about a data-recording reference light beam pattern for generating a reference light beam that is the same as the reference light beam used for recording the recorded data; and a reference-beam spatial light modulating section on which the data-recording reference light beam pattern is displayed in accordance with the information about the data-recording reference light beam pattern acquired by the data-recording reference light beam pattern acquiring unit;

wherein the recorded data is reconstructed from the data-recording hologram.

\* \* \* \* \*